(12) United States Patent
Todhunter et al.

(10) Patent No.: US 8,583,422 B2
(45) Date of Patent: Nov. 12, 2013

(54) SYSTEM AND METHOD FOR AUTOMATIC SEMANTIC LABELING OF NATURAL LANGUAGE TEXTS

(75) Inventors: James Todhunter, Framingham, MA (US); Igor Sovpel, Minsk (BY); Dzianis Pastanohau, Minsk (BY)

(73) Assignee: Invention Machine Corporation, Boston, MA (US)

( * ) Notice: Subject to any disclaimer, the term of this patent is extended or adjusted under 35 U.S.C. 154(b) by 618 days.

(21) Appl. No.: 12/723,472

(22) Filed: Mar. 12, 2010

(65) Prior Publication Data

US 2010/0235165 A1 Sep. 16, 2010

Related U.S. Application Data

(60) Provisional application No. 61/159,972, filed on Mar. 13, 2009, provisional application No. 61/159,959, filed on Mar. 13, 2009.

(51) Int. Cl.
*G06F 17/27* (2006.01)

(52) U.S. Cl.
USPC .......... 704/9; 704/1; 707/706; 707/759; 715/205; 715/235

(58) Field of Classification Search
USPC .......... 704/1, 9; 707/1, 706, 759; 715/205, 715/235, 853, 854
See application file for complete search history.

(56) References Cited

U.S. PATENT DOCUMENTS

| | | |
|---|---|---|
| 4,829,423 A | 5/1989 | Tennant et al. |
| 4,864,502 A | 9/1989 | Kucera et al. |
| 4,868,750 A | 9/1989 | Kucera et al. |
| 4,887,212 A | 12/1989 | Zamora et al. |
| 5,060,155 A | 10/1991 | van Zuijlen |
| 5,146,405 A | 9/1992 | Church |
| 5,331,556 A | 7/1994 | Black, Jr. et al. |
| 5,369,575 A | 11/1994 | Lamberti et al. |
| 5,377,103 A | 12/1994 | Lamberti et al. |
| 5,404,295 A | 4/1995 | Katz et al. |
| 5,418,889 A | 5/1995 | Ito |
| 5,424,947 A | 6/1995 | Nagao et al. |

(Continued)

FOREIGN PATENT DOCUMENTS

| | | |
|---|---|---|
| CN | 101702944 | 5/2010 |
| CN | 101702944 A | 5/2010 |

(Continued)

OTHER PUBLICATIONS

Girju, et al., "Automatic Discovery of Part-Whole Relations," Association for Computational Linguistics, Mar. 2006, pp. 83-135, vol. 32, No. 1, MIT Press, Cambridge, MA, USA.

(Continued)

*Primary Examiner* — Jialong He
(74) *Attorney, Agent, or Firm* — Faegre Baker Daniels LLP

(57) ABSTRACT

Systems and methods for automatic semantic labeling of natural language documents provided in electronic or digital form include a semantic processor that performs a basic linguistic analysis of text, including recognizing in the text semantic relationships of the type objects and/or classes of objects, facts and cause-effect relationships; matching linguistically analyzed text against target semantic relationship patterns, created by generalization of particular cases of target semantic relationships; and generating semantic relationship labels based on linguistically analyzed text and a result of the matching.

24 Claims, 8 Drawing Sheets

(56) References Cited

U.S. PATENT DOCUMENTS

| | | |
|---|---|---|
| 5,485,372 A | 1/1996 | Golding et al. |
| 5,559,940 A | 9/1996 | Hutson |
| 5,614,899 A | 3/1997 | Tokuda et al. |
| 5,638,543 A | 6/1997 | Pedersen et al. |
| 5,694,592 A | 12/1997 | Driscoll |
| 5,696,916 A | 12/1997 | Yamazaki et al. |
| 5,708,825 A | 1/1998 | Sotomayor |
| 5,715,468 A | 2/1998 | Budzinski |
| 5,724,571 A | 3/1998 | Woods |
| 5,748,973 A | 5/1998 | Palmer et al. |
| 5,761,497 A | 6/1998 | Holt et al. |
| 5,774,845 A | 6/1998 | Ando et al. |
| 5,794,050 A | 8/1998 | Dahlgren et al. |
| 5,799,268 A | 8/1998 | Boguraev |
| 5,802,504 A | 9/1998 | Suda et al. |
| 5,844,798 A | 12/1998 | Uramoto |
| 5,873,056 A | 2/1999 | Liddy et al. |
| 5,873,076 A | 2/1999 | Barr et al. |
| 5,878,385 A | 3/1999 | Bralich et al. |
| 5,924,108 A | 7/1999 | Fein et al. |
| 5,933,822 A | 8/1999 | Braden-Harder et al. |
| 5,963,940 A | 10/1999 | Liddy et al. |
| 5,966,686 A | 10/1999 | Heidorn et al. |
| 5,978,820 A | 11/1999 | Mase et al. |
| 6,026,388 A | 2/2000 | Liddy et al. |
| 6,056,428 A | 5/2000 | Devoino et al. |
| 6,076,051 A | 6/2000 | Messerly et al. |
| 6,076,088 A | 6/2000 | Paik et al. |
| 6,128,634 A | 10/2000 | Golovchinsky et al. |
| 6,167,370 A | 12/2000 | Tsourikov et al. |
| 6,185,592 B1 | 2/2001 | Boguraev et al. |
| 6,202,043 B1 | 3/2001 | Devoino et al. |
| 6,205,456 B1 | 3/2001 | Nakao |
| 6,212,494 B1 | 4/2001 | Boguraev |
| 6,246,977 B1 | 6/2001 | Messerly et al. |
| 6,263,335 B1 | 7/2001 | Paik et al. |
| 6,317,708 B1 | 11/2001 | Witbrock et al. |
| 6,338,034 B1 | 1/2002 | Ishikawa et al. |
| 6,349,316 B2 | 2/2002 | Fein et al. |
| 6,374,209 B1 | 4/2002 | Yoshimi et al. |
| 6,381,598 B1 | 4/2002 | Williamowski et al. |
| 6,401,086 B1 | 6/2002 | Bruckner |
| 6,424,362 B1 | 7/2002 | Bornstein et al. |
| 6,442,566 B1 | 8/2002 | Atman et al. |
| 6,459,949 B1 | 10/2002 | Black et al. |
| 6,537,325 B1 | 3/2003 | Nishizawa |
| 6,557,011 B1 | 4/2003 | Sevitsky et al. |
| 6,701,345 B1 | 3/2004 | Carley et al. |
| 6,754,654 B1 | 6/2004 | Kim et al. |
| 6,789,230 B2 | 9/2004 | Katariya et al. |
| 6,823,325 B1 | 11/2004 | Davies et al. |
| 6,823,331 B1 | 11/2004 | Abu-Hakima |
| 6,871,199 B1 | 3/2005 | Binnig et al. |
| 7,035,877 B2 | 4/2006 | Markham et al. |
| 7,120,574 B2 | 10/2006 | Troyanova et al. |
| 7,251,781 B2 | 7/2007 | Batchilo et al. |
| 2001/0014852 A1 | 8/2001 | Tsourikov et al. |
| 2001/0049688 A1 | 12/2001 | Fratkina et al. |
| 2002/0010574 A1 | 1/2002 | Tsourikov et al. |
| 2002/0103793 A1 | 8/2002 | Koller et al. |
| 2002/0116176 A1* | 8/2002 | Tsourikov et al. ............ 704/9 |
| 2002/0169598 A1 | 11/2002 | Minker |
| 2002/0184206 A1 | 12/2002 | Evans |
| 2003/0130837 A1* | 7/2003 | Batchilo et al. ............ 704/9 |
| 2004/0001099 A1 | 1/2004 | Reynar et al. |
| 2004/0261021 A1 | 12/2004 | Mittal et al. |
| 2005/0055385 A1 | 3/2005 | Sinha et al. |
| 2005/0114282 A1 | 5/2005 | Todhunter |
| 2005/0131874 A1 | 6/2005 | Verbitsky |
| 2006/0041424 A1 | 2/2006 | Todhunter et al. |
| 2006/0167931 A1 | 7/2006 | Bobick et al. |
| 2006/0242195 A1 | 10/2006 | Bove et al. |
| 2007/0006177 A1 | 1/2007 | Aiber et al. |
| 2007/0050393 A1 | 3/2007 | Vogel et al. |
| 2007/0094006 A1* | 4/2007 | Todhunter et al. ............ 704/8 |
| 2007/0156393 A1 | 7/2007 | Todhunter et al. |
| 2008/0294637 A1 | 11/2008 | Liu |
| 2008/0319735 A1 | 12/2008 | Kambhatla et al. |

FOREIGN PATENT DOCUMENTS

| | | |
|---|---|---|
| EP | 1793318 | 6/2007 |
| EP | 1793318 A2 | 6/2007 |
| EP | 2135175 | 12/2009 |
| EP | 2135175 A1 | 12/2009 |
| JP | 4467184 | 5/2010 |
| JP | 4467184 B2 | 5/2010 |
| KR | 10-2009-0130854 | 12/2009 |
| KR | 20090130854 A | 12/2009 |
| WO | 0014651 | 3/2000 |
| WO | 0014651 A1 | 3/2000 |
| WO | 2007051106 | 5/2007 |
| WO | 2007051106 A2 | 5/2007 |
| WO | 2008113065 | 9/2008 |
| WO | 2008113065 A1 | 9/2008 |
| WO | 2009016631 | 2/2009 |
| WO | 2009016631 A2 | 2/2009 |

OTHER PUBLICATIONS

Extended European Search Report dated Apr. 1, 2011 issued in corresponding European Application No. 08732326.7.

Extended European Search Report dated Jul. 18, 2012, issued in corresponding European Application No. 10751508.

Extended European Search Report dated Jul. 20, 2012, issued in corresponding European Application No. 10751510.

Davidov, et al., "Classification of Semantic Relationships between Nominals Using Pattern Clusters." In:Proc. of ACL-08:HTL. Columbus, Ohio, USA, p. 227-235. Jun. 30, 2008.

International Search Report dated Sep. 29, 2010 issued in corresponding International Application No. PCT/US2010/027218.

International Search Report dated Oct. 13, 2010 issued in corresponding International Application No. PCT/US2010/027221.

Kupiec, Julian, et al., "A Trainable Document Summarizer," ACM Press Proceeding of the 18th Annual International ACM SIGIR Conference on Research and Development in Information Retrieval, pp. 68-73, 1995.

Goldstein, et al., "Summarizing Text Documents: Sentence Selection and Evaluation Metrics," Proceedings of the 22nd annual international ACM SIGIR conference on Research and development in information retrieval, 1999, pp. 121-128.

International Search Report dated Nov. 17, 1999 issued in corresponding International Application No. PCT/US1999/19699.

Ball, G., et al., "Lifelike Computer Characters: The Persona Project at Microsoft Research", Software Agents, AAAI Press/The MIT Press, 1997, Chapter 10.

Reicken, D.,Software Agents, AAAI Press/The MIT PRess, 1997, Chapter 12 "The M System".

International Search Report dated Jul. 30, 2008 issued in corresponding International Application No. PCT/US2008/057183.

Tapanainen, P., et al., "A non-projective dependency parser", Fifth Conference on Applied Natural Language Processing, Mar. 31, 1997-Apr. 3, 1997, Association for Computational Linguistics, pp. 64-71.

Abney, S., et al., "Answer Extraction", Proceedings of the 6th Applied Natural Language Processing Conference, Apr. 29-May 4, 2000, pp. 296-301.

Amaral, Carlos, et al., "Design and Implementation of a Semantic Search Engine for Portuguese", May 26-28, 2004, Portual, Proceedings of the 4th International Conference on Language Resources and Evaluation, XP-002427855.

Cardie, C., et al., "Examining the Role of Statistical and Linguistic Knowledge Sources in a General-Knowledge Question-Answering System", Proceedings of the 6th Applied Natural Language Processing Conference, Apr. 29-May 4, 2000, pp. 180-187.

Chan, Ki, et al., "Extracting Causation Knowledge from Natural Language Texts", May 2002, Springer-Verlag, Proceedings of the 6th Pacific-Asia Conference on Advances in Knowledge Discovery and Data Mining, Lecture Notes in Computer Science 2336, XP002427021, pp. 555-560.

(56) References Cited

OTHER PUBLICATIONS

Chang, Du-Seong, et al., "Causal Relation Extraction Using Cue Phrase and Lexical Pair Probabilities", Jan. 25, 2005, Springer Berlin/Heidelberg, Lecture Notes in Computer Science 3248, XP002427022, pp. 61-70.

Feng, L., et al., "Beyond information searching and browsing: acquiring knowledge from digital libraries", Information Processing and Management, 41 (2005), pp. 97-120.

Girju, Roxana, "Automatic Detection of Causal Relations for Questioning Answering", 2003, Association for Computational Linguistics, Proceedings of the ACL 2003 Workshop on Multilingual Summarization and Question Answering, XP002427020, pp. 77-80.

Goldstein et al., "Summarizing Text Documents: Sentence Selection and Evaluation Metrics," Proceedings of the 22nd annual international ACM SIGIR conference on Research and development in information retrieval, 1999, pp. 121-128.

International Search Report issued in corresponding PCT Application No. PCT/US2006/060191 dated Nov. 4, 2007.

Khoo, Christopher S.G., et al., "Automatic Extraction of Cause-Effect Information from Newspaper Text Without Knowledge-Based Inferencing", XP-002427013, Literary and Linguistic Computing, vol. 13, No. 4, 1998, pp. 177-186.

Khoo, Christopher S.G., et al., "Extracting Causal Knowledge from a Medical Database Using Graphical Patterns", 2000, Association for Computational Linguistics, Proceedings of the 38th Annual Meeting on Association for Computational Linguistics, Hong Kong, XP002427019, pp. 336-343.

Neumann, Gunter, et al., "A Cross-Language Question/Answering-System for German and English", Aug. 21-22, 2003, Norway, Cross Language Evaluation Forum, Proceedings following the 7th European Conference on Digital Libraries (ECDL 2003), XP002427856.

Paice, Christopher, et al., "The Use of Causal Expressions for Abstracting and Question Answering", Sep. 21-23, 2005, Bulgaria, Proceedings of the International Conference RANLP 2005 (Recent Advances in Natural Language Processing), XP002427857.

Radev, D.R., et al., "Ranking Suspected Answers to Natural Language Question Using Predictive Annotation", Proceedings of the 6th Applied Natural Language Processing Conference, Apr. 29-May 4, 2000, pp. 150-157.

Srihari, R., et al., "A Question Answering System Supported by Information Extraction", Proceedings of the 6th Applied Natural Language Processing Conference, Apr. 29-May 4, 2000, pp. 166-172.

Volk, Martin et al., "Semantic Annotation for Concept-Based Cross-Language Medical Information Retrieval", International Journal of Medical Informatics 67 (2002), pp. 97-112.

* cited by examiner

Input Sentence: A dephasing element guide completely suppresses unwanted modes

| Subject | dephasing element guide |
|---|---|
| Action | suppress |
| Object | unwanted mode |
| Preposition | |
| Indirect Object | |
| Adjective | |
| Adverbial | completely |

*FIG. 4A*

Input Sentence: The maximum value of x is dependent on the ionic radius of the lanthanide element

| Subject | maximum value of x |
|---|---|
| Action | be |
| Object | |
| Preposition | on |
| Indirect Object | ionic radius of the lanthanide element |
| Adjective | dependent |
| Adverbial | |

*FIG. 4B*

| Subject | CAUSE_OF | Effect |
|---|---|---|
| Action | BE | |
| Object | Exist | Cause |
| Preposition | — | |
| Indirect Object | — | |
| Adjective | — | |
| Adverbial | — | |

*FIG. 5A*

The cause of water evaporation is heat

| Subject | cause of water evaporation |
|---|---|
| Action | be |
| Object | heat |
| Preposition | |
| Indirect Object | |
| Adjective | |
| Adverbial | |

<u>Cause:</u> heat
<u>Effect:</u> water evaporation

*FIG. 5B*

| Subject1 | exist | |
|---|---|---|
| Action1 | ACTIVE | |
| Object1 | – | |
| Preposition1 | – | Cause |
| Indirect Object1 | – | |
| Adjective1 | – | |
| Adverbial1 | – | |
| Subject2 | – | |
| Action2 | TO_VB \| DO \| HV | |
| Object2 | exist | |
| Preposition2 | – | Effect |
| Indirect Object2 | – | |
| Adjective2 | – | |
| Adverbial2 | – | |

*FIG. 6A*

The register contains the proper bit pattern to begin its shift-out operation

| Cause | |
|---|---|
| Subject1 | register |
| Action1 | contain |
| Object1 | proper bit pattern |
| Preposition1 | |
| Indirect Object1 | |
| Adjective1 | |
| Adverbial1 | |
| Effect | |
| Subject2 | |
| Action2 | begin |
| Object2 | shift-out operation |
| Preposition2 | |
| Indirect Object2 | |
| Adjective2 | |
| Adverbial2 | |

*FIG. 6B*

SYSTEM AND METHOD FOR AUTOMATIC SEMANTIC LABELING OF NATURAL LANGUAGE TEXTS

RELATED APPLICATIONS

The present application claims priority to U.S. Provisional Patent Application No. 61/159,972, filed Mar. 13, 2009, entitled "System and method for automatic semantic labeling of natural language texts," and to U.S. Provisional Patent Application Ser. No. 61/159,959, filed Mar. 13, 2009, entitled "Question-Answering System And Method Based On Semantic Labeling Of Text Documents And User Questions", each of which is incorporated by reference herein in its entirety.

The present application is related to U.S. Pat. No. 6,167,370, entitled "Document semantic analysis/selection with knowledge creativity capability utilizing subject-action-object (SAO) structures", issued Dec. 26, 2000 to Tsourikov et al., and U.S. Pat. No. 7,251,781 "Computer based summarization of natural language documents", issued Jul. 31, 2007 to Batchilo et al., each incorporated by reference herein in its entirety.

FIELD OF INTEREST

This application relates to systems and methods for the automatic semantic labeling of natural language texts and to the technology pertaining to the creation of linguistic patterns that provide the basis for performing this labeling.

BACKGROUND

The following U.S. Patent documents provide descriptions of art related to the present application: U.S. Pat. No. 5,418,889, issued May 1995 to Ito (hereinafter "Ito"); U.S. Pat. No. 5,696,916, issued December 1997 to Hitachi (hereinafter "Hitachi"); U.S. Pat. No. 6,026,388, issued February 2000 to Liddy et al. (hereinafter "Liddy"); U.S. Pat. No. 6,185,592, issued February 2001 to Boguraev et al. (hereinafter "Boguraev 1"); U.S. Pat. No. 6,212,494, issued April 2001 to Boguraev (hereinafter "Boguraev 2"); U.S. Pat. No. 6,246,977, issued June 2001 to Messerly et al. (hereinafter "Messerly"); U.S. Pat. No. 6,263,335, issued July 2001 to Paik et al. (hereinafter "Paik"); and U.S. Pat. No. 7,421,645, issued September 2008 to Reynar (hereinafter "Reynar").

Automatic text processing, which can include the tasks of information retrieval, knowledge engineering, machine translation, summarization, etc., requires a certain linguistic analysis to be performed.

This analysis, especially as the depth and complexity of the analysis increases from the primary lexical level to the semantic level, is based on the traditional knowledge of the language, e.g., vocabulary, morphology, etc., and on the so-called recognizing linguistic models or patterns that, to a certain extent, can model cognitive functions of a person performing text apprehension and that make use of concrete lexical units of the language, as well as their part-of-speech classes and elements of syntactical and semantic relationships. The two abovementioned types of knowledge together with statistical methods provide the basis for the algorithms of automatic recognition of various semantic components, relationships, and their attributes in text, e.g., keywords, objects and their parameters, agents, actions, facts, cause-effect relationships and others. In other words, they provide an automatic semantic labeling of natural language text in accordance with a previously specified classifier, for example, semantically labeling strings of text. The latter in turn is defined based on the final goal of the text processing task.

Some existing methods are aimed at databases having a strict structure and are manually compiled or aimed at text having strictly defined fields. A shallow linguistic analysis of text is usually performed, which does not produce high accuracy. In particular, the semantic labeling of strings of text boils down to a recognition of only several special types of semantic components or relationships. In this manner, Reynar provides application program interfaces for labeling strings of text with a semantic category or list while a user is creating a document and provides user e-commerce actions based on the category or list. A list may include, for example, a type label "Person Name" or "Microsoft Employee."

Hitachi describes a system that uses a predefined concept dictionary with high-low relationships, namely, "is-a" relations and "part-whole" relations between concepts.

Liddy uses a similar technology for user query expansion in an information search system.

Ito describes the use of a knowledge base, including a causal model base and a device model base. The device model base has sets of device knowledge describing the hierarchy of devices of the target machine. The causal model base is formed on the basis of the device model base and has sets of causal relations of fault events in the target machine. Thus, the possible cause of failure in each element of a device is guessed on the basis of information about its structural connections with other elements of the device. Usually, these are the most "connected" elements, which are determined as the cause.

Boguraev 1 describes the performance of a deep text analysis where, for text segments, the most significant noun groups are marked on the basis of their usage frequency in weighted semantic roles.

Boguraev 2 describes the use of computer-mediated linguistic analysis to create a catalog of key terms in technical fields and also determine doers (solvers) of technical functions (verb-object).

Paik describes an information extraction system that is domain-independent and automatically builds its own subject knowledge base. The basis of this knowledge base is composed of concept-relation-concept triples (CRCs), where the first concept is usually a proper name. This is an example of a quite deep semantic labeling of text that relies on recognition of dyadic relations that link pairs of concepts and monadic relations that are associated with a single concept. The system extracts semantic relationships from the previously part-of-speech tagged and syntactically parsed text by looking for specialized types of concepts and linguistic clues, including some prepositions, punctuation, or specialized phrases.

Of course, the procedure of semantic labeling is restricted in this case by the framework of CRC relations. For example, recognition of cause-effect relationships can be performed only for objects occurring together with certain types of verbs. Although such recognition often requires a wider context, and it turns out that in the general case it should be based on a set of automatically recognized semantic components in texts, the so-called facts. For example, one of the components of such facts is a semantic notion of an "action," in contrast to merely a "verb". Taking into account the restriction inherent in the imposed framework of CRC relations, semantic labeling in this case requires the development of a large number of patterns which is very labor-consuming. Finally, such semantic labeling actually deals only with topical content of the text and does not take into account its logical content.

Messerly performs semantic labeling of text in the logical foam "deep subject-verb-deep object." However, the above-mentioned logical faun is purely a grammatical notion; "deep subject" and "deep object" are each only a "noun," and a "verb" is only a "principle verb".

SUMMARY

In accordance with aspects of the present invention, provided is a unique semantic processor (SP) where labor-intensiveness is decreased, the quality of produced results is increased, and the sphere of applications using related semantic processing is extended. Such a semantic processor performs a deeper basic linguistic analysis of text, which is oriented on some universal semantic structures, and performs its semantic labeling according to a technological approach that utilizes those semantic structures and is responsive to user requirements and/or inputs.

Also accordance with aspects of the present invention, provided are a system and a method for automatic semantic labeling of natural language texts. The system and method include or use a semantic processor that performs the basic linguistic analysis of text, including its preformatting, lexical, part-of-speech, syntactic, and semantic analysis of a certain type. Such analysis itself is a part of semantic labeling of text that recognizes the most important semantic components and relationships. Additionally, results of such analysis can also be used for the effective creation of specialized linguistic patterns aimed at additional semantic labeling. These patterns are responsive to an indicated goal of the text processing.

The depth of the linguistic analysis of text performed by the semantic processor is determined by what it should provide in terms of achieving semantic labeling goals. From these goals a set of criteria can be determined, which can include:
  a) universality of semantic components and relationships extracted during the basic linguistic analysis;
  b) the maximum possible "coverage" of the analyzed text;
  c) the possibility of semantic labeling of not only text topical content, but also its logical content;
  d) the maximum possible generalization of linguistic patterns developed for further semantic labeling; and
  e) independence of the algorithms of semantic labeling from the subject domain and, to a certain degree, from the natural language (NL) text.

A semantic processor in accordance with aspects of the present invention as achieves such depth with a level of basic types of knowledge, as follows: objects/classes of objects, facts, and a set of rules reflecting regularities of external domains, for example the outside world and/or the knowledge domain in the form of cause-effect relationships. This deep level of linguistic analysis satisfies the above-mentioned criteria.

Accordingly, labeling of input text at the stage of its basic linguistic processing by the semantic processor yields: (a) automatic recognition of objects/classes of objects; (b) further recognition of facts over the plurality of objects, i.e., S-A-O (subject-action-object) type relationships and attributes of components of these relationships; and (c) further recognition of cause-effect relationships over the plurality of facts. Such relationships, their components and attributes together with part-of-speech and syntactical tags, can comprise a set of labels that can be assigned by the semantic processor. In the aggregate, these labels cover practically all lexical units of the input text processed at the stage of its basic linguistic analysis. These labels can also ensure effective technological development of linguistic patterns aimed at further text semantic labeling that can depend on the requirements of the specific application.

In accordance with some aspects of the present invention, once an expert has found in the input text, processed at the stage of basic linguistic analysis and processing, a specific example of a new semantic relation (also referred to as a relationship) of interest, for example "whole-part", "location", "time", etc, the expert can instantly see labels of all the constituent components at all the important levels of NL: from part-of-speech and syntactic tags to semantic labels. Therefore, an expert can formulate, with the maximum possible degree of generalization, a prototype of a linguistic pattern that is aimed at automatic recognition of a new semantic relationship found in the form of an example in any text— using the same semantic processor.

In some embodiments, generalization of linguistic patterns can be performed manually by an expert through interaction with the semantic processor, or automatically by the semantic processor. This becomes possible because of the basic linguistic analysis of text that provides an efficient context for those purposes. Those linguistic pattern prototypes that have passed a testing stage can be stored in a pattern database, which can be a part of a linguistic knowledge base for use by the semantic processor.

In accordance with one aspect of the inventive concepts, provided is a method for automatic labeling of natural language text. The method includes: providing at least one computer processor coupled to at least one non-transitory storage medium. The at least one computer processor performs the method, including: receiving text from at least one natural language document in electronic form; performing a basic linguistic analysis of the text; matching the linguistically analyzed text against stored target semantic relationship patterns; producing semantically labeled text by generating semantic relationship labels based on the linguistically analyzed text and a result of the matching of the linguistically analyzed text against the target semantic relationship patterns, wherein the semantic relationship labels are associated with words or phrases from sentences within the text and indicate components of predetermined types of semantic relationships; and storing the semantically labeled text in a database.

The method can, further include applying parts-of-speech tags to at least portions of the text to generate tagged portions of the text; parsing the tagged portions of the text to generate parsed and tagged portions of the text; and semantically analyzing the parsed and tagged portions of the text to generate semantically analyzed, parsed and tagged portions of the text.

Applying the parts-of-speech tags can be performed on preformatted portions of the text, whereby the preformatted portions of the text comprise the text with non-natural language symbols removed.

Semantically analyzing the parsed and tagged portions of the text can include recognizing one or more facts in the form of at least one expanded Subject-Action-Object (eSAO) set in the text, wherein each eSAO set has at least one eSAO component; and recognizing in the text a set of rules that reflect regularities of at least one of an external domain and a knowledge domain in the form of cause-effect relationships in at least one eSAO set, wherein at least one cause-effect relationship of the cause-effect relationships comprises a cause eSAO and an effect eSAO.

The at least one eSAO component can include text related to one or more elements selected from the group consisting of subjects, objects, actions, adjectives, prepositions, indirect objects, and adverbs.

Recognizing one or more expanded Subject-Action-Object (eSAO) sets in the text can include recognizing one or more subjects, objects, actions, adjectives, prepositions, indirect objects, and adverbs in at least one sentence of the text.

Recognizing one or more expanded Subject-Action-Object (eSAO) sets and cause-effect relationships in the text can include accessing a linguistic knowledge base having a database of patterns defining eSAO and cause-effect components.

The cause eSAO can include at least one eSAO component of the at least one eSAO set and the effect eSAO can include at least one other eSAO component of the at least one eSAO set.

The at least one cause-effect relationship can include a sequential operator relating the at least one eSAO component of the cause eSAO to the at least one other eSAO component of the effect eSAO with lexical, grammatical, and/or semantic language means.

Matching the linguistically analyzed text against target semantic relationship patterns can further include accessing a pattern database that is a part of a linguistic knowledge database, wherein the pattern database is generated by: performing a basic linguistic analysis of a corpus of text documents; recognizing in the linguistically analyzed corpus particular cases of target semantic relationships; generalizing the particular cases of target semantic relationships into linguistic patterns using lexical language units and their semantic classes, part-of-speech and syntactic tags, eSAO and cause-effect labels from the recognized particular cases of target semantic relationships; and storing the linguistic patterns.

Generalizing the particular cases of target semantic relationships into linguistic patterns can use an eSAO format as a context, and can include generalizing constituent components of the particular cases of target semantic relationships by searching in the linguistically analyzed corpus of text documents using lexical, grammatical, syntactic, eSAO and cause-effect labels obtained for the components from the basic linguistic analysis.

Matching the linguistically analyzed text against the target semantic relationship patterns can include matching words, part-of-speech tags, syntactic tags, eSAO, and cause-effect sets, wherein generating the semantic relationship labels can include generating eSAO and cause-effect labels.

In accordance with another aspect of the invention, provided is a computer program product comprising a computer-readable medium having computer-executable instructions that perform a method for semantic labeling of natural language texts when executed by at least one processor. The method includes: receiving text from at least one natural language document; performing a basic linguistic analysis of the text; matching the linguistically analyzed text against stored target semantic relationship patterns; producing semantically labeled text by generating semantic relationship labels based on the linguistically analyzed text and a result of the matching of the linguistically analyzed text against the target semantic relationship patterns, wherein the semantic relationship labels are associated with words or phrases from sentences within the text and indicate components of predetermined types of semantic relationships; and storing the semantically labeled text in a database.

In accordance with another aspect of the invention, provided is a semantic processor for automatically semantic labeling of natural language text in electronic or digital form. The semantic processor includes: a preformatter that preformats received electronic text; a linguistic analyzer that performs basic linguistic analysis of the preformatted text; a labeler that matches the linguistically analyzed text against stored target semantic relationship patterns to produce semantically labeled text, wherein the semantically labeled text includes semantic relationship labels associated with words or phrases from sentences within the text that indicate components of predetermined types of semantic relationships.

The linguistic analyzer can comprise a semantic analyzer that produces semantically analyzed text. The semantic analyzer can include: an expanded Subject-Action-Object (eSAO) recognizer that recognizes eSAOs sets in the text; and a cause-effect (C-E) recognizer that recognizes a cause-effect relationship, wherein eSAO and C-E recognition is based on linguistic patterns stored in a linguistic knowledge base.

The semantic relationship labels generated by the labeler can include eSAO labels and cause-effect labels.

The eSAO cause-effect relationship can comprise a cause eSAO, an effect eSAO, and at least one sequential operator relating the cause eSAO to the effect eSAO.

Each eSAO set can include eSAO components and the cause eSAO can include at least one eSAO component of the eSAO components and the effect eSAO can include at least one eSAO component of the eSAO components that is different from the at least one eSAO component of the cause eSAO.

The eSAO components can include text related to one or more elements selected from the group consisting of subjects, objects, actions, adjectives, prepositions, indirect objects and adverbs.

The linguistic analyzer can further include: a part-of-speech (POS) tagger that receives the preformatted text and produces POS tagged text; and a parser that receives the POS tagged text, produces parsed text, and provides the parsed text to the semantic analyzer, wherein the parts-of-speech tagger and the parser operate with data stored in the linguistic knowledge base.

The preformatter can perform at least one of a removal of any symbols in a digital or electronic presentation of the text that do not form part of natural language text, a detection and correction of any mismatches or mistakes in the text, and partitioning the text into structures of sentences and words.

The target semantic relationship patterns can be created by a pattern generator comprising: a corpus linguistic analyzer that performs basic linguistic analysis of a corpus of text documents; a labeled text corpus generator that generates a labeled text corpus having part-of-speech tags, syntactic tags, eSAO labels, and cause-effect labels; a relation generator that recognizes in the labeled text corpus particular cases of target semantic relationships; a pattern generator that generalizes the particular cases of semantic relationships by using their labels to generate more general linguistic patterns, wherein the labels include lexical language units, their semantic classes, part-of-speech and syntactic tags, and eSAO and cause-effect labels; and a pattern tester for testing the general linguistic patterns by the pattern generator.

When generalizing the particular cases of target semantic relationships into linguistic patterns, the pattern generator can use an eSAO format as a context to: generalize constituent components as a result of searching in the linguistically analyzed corpus of text documents using of part-of-speech, syntactic, and eSAO and cause-effect labels obtained for the components at a level of the basic linguistic analysis.

The labeler can match the linguistically analyzed text against target semantic relationship patterns by matching words, part-of-speech tags, syntactic tags, eSAO and cause-effect sets.

BRIEF DESCRIPTION OF THE DRAWINGS

The drawing figures depict preferred embodiments by way of example, not by way of limitation. In the figures, like reference numerals refer to the same or similar elements. The drawings are not necessarily to scale, emphasis instead being placed upon illustrating aspects of the invention.

FIG. 4A and FIG. 4B show an embodiment of an output of an eSAO recognizer for two specific sentences.

FIG. 5A illustrates an example embodiment of a generic form of a linguistic pattern for recognition of C-E relations inside a single eSAO.

FIG. 5B shows an embodiment of an output of a C-E recognizer for a given sentence using of the linguistic pattern described in FIG. 5A.

FIG. 6A illustrates an example embodiment of a generic form of a linguistic pattern of recognition of C-E relations between two eSAOs.

FIG. 6B shows an embodiment of an output of a C-E recognizer for a specific sentence using the linguistic pattern described in FIG. 6A.

DETAILED DESCRIPTION

Figure 1:
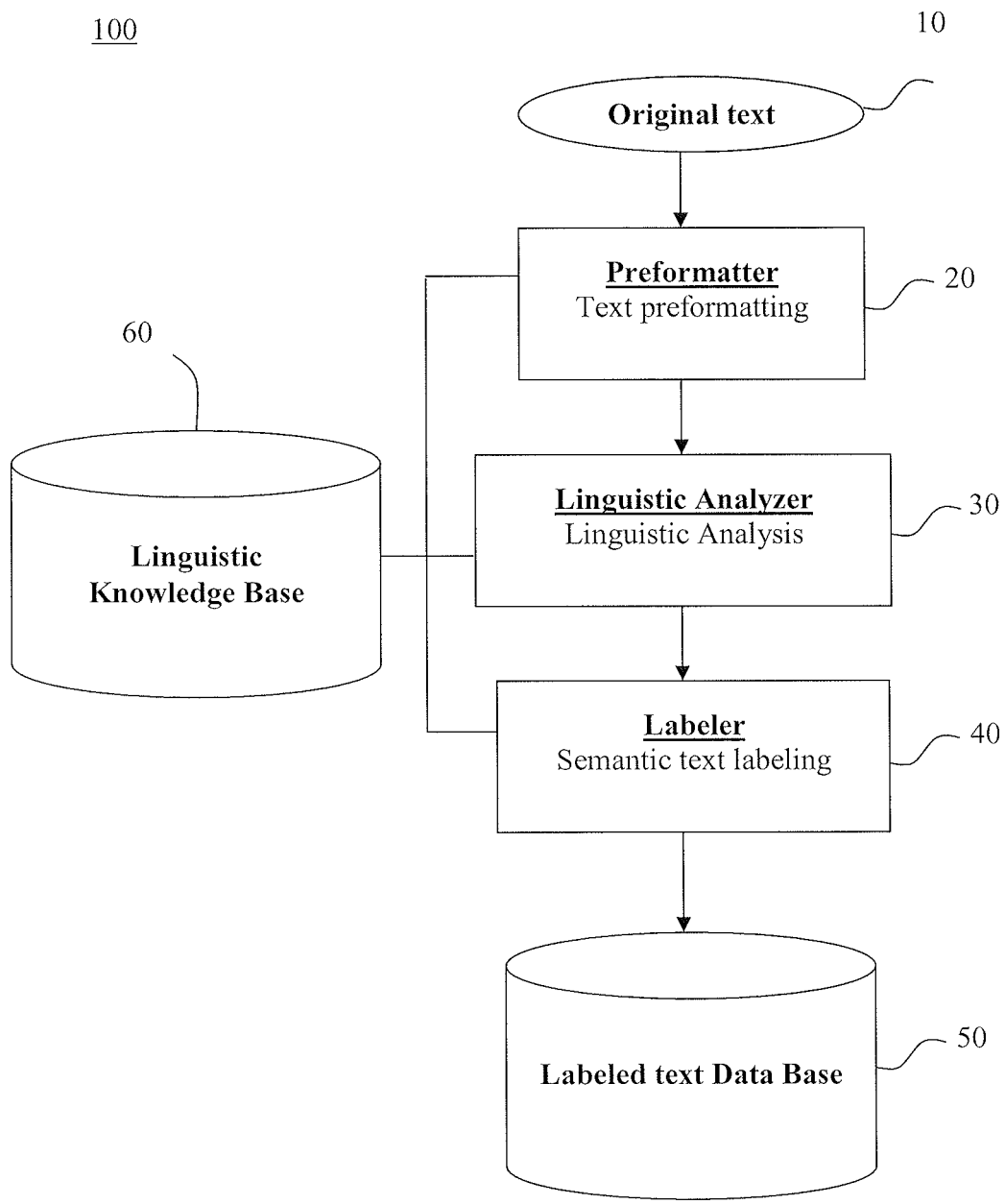
FIG. 1 is a high-level architecture diagram of an embodiment of a set of functional modules or processors, which can be implemented in one or more computers, to form a semantic processor, according to aspects of the present invention.

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

In accordance with aspects of the present invention, provided is a unique semantic processor (SP) where labor-intensiveness is decreased, the quality of produced results is increased, and the sphere of applications using related semantic processing is extended. Such a semantic processor performs a deeper basic linguistic analysis of text, which is oriented on a set of semantic structures, and performs its semantic labeling according to a technological approach that utilizes those semantic structures and further on user requirements.

Embodiments of the present invention relate to systems and methods for automatic semantic labeling of natural language text in electronic form. The system includes a semantic processor, which performs basic linguistic analysis of the input text, recognition of objects/object classes, recognition of facts from a set of objects, and recognition of cause-effect relationships from a set of facts. The abovementioned semantic relationships are independent of a subject domain and language and represent three major types of knowledge about external domains, such as the outside world and/or the subject domain.

These semantic relationships, together with their components and attributes, determine a set of semantic labels, also referred to as semantic relationship labels, wherein the semantic processor performs semantic text labeling on the input text during the basic linguistic analysis stage and thereby helps develop linguistic patterns for further target semantic labeling, depending on the needs of the specific application.

In accordance with embodiments of the present invention, the semantic processing for labeling text in electronic or digital form comprises: preformatting the text; performing linguistic analysis; and text labeling.

FIG. 1 is a high-level architecture diagram of an embodiment of a set of functional modules or processors, which can be implemented in one or more computers, to form a Semantic Labeling Processor 100, also referred to as a Semantic Processor (SP) 100, in accordance with aspects of the present invention.

Semantic Processor 100 is structured, adapted, or configured to process an Original Text 10 to produce a Labeled Text Database 50. In this embodiment, the Semantic Processor 100 includes a Preformatter 20 that preformats the Original Text 10, a Linguistic Analyzer 30 that performs linguistic analysis of the preformatted text, and a Labeler 40 that performs semantic labeling of the linguistically analyzed text and produces the Labeled Text Database 50. In an embodiment, the Labeler 40, also referred to as a semantic labeler, matches or compares the semantically analyzed text to target semantic relationship patterns (or linguistic patterns) stored in or accessible by the Linguistic Knowledge Base 60, and generates semantic relationship labels based on the semantically analyzed text and the matching results. The semantic labels can include labels of words or phrases in the analyzed text that correspond to certain types of semantic relationships, e.g., cause-effect and/or whole-part.

The functionality of the modules of the Semantic Processor 100 may be embodied in computer program code that is executable by at least one processor and is maintained in a Linguistic Knowledge Base 60. The semantic processing functionality could alternatively or additionally be embodied in hardware, firmware, or a combination of the foregoing, which is also true of other functional modules or processors described herein. The Linguistic Knowledge Base 60 can include various databases, such as dictionaries, classifiers, statistical data, etc. and databases of recognizing linguistic models or linguistic patterns used for text-to-words splitting, recognition of noun and verb phrases, subject, object, action and their attributes, cause-effect relationship recognition, etc. The Linguistic Analyzer 30 and the Labeler 40 are described in additional detail below. The text preformatting performed by the Preformatter 20 is preferably performed according to the techniques described in U.S. Pat. No. 7,251,781, incorporated by reference above. Preferably, in the present embodiment, preformatting the text includes removing non-natural language symbols, e.g., punctuation, from the text.

Figure 2:
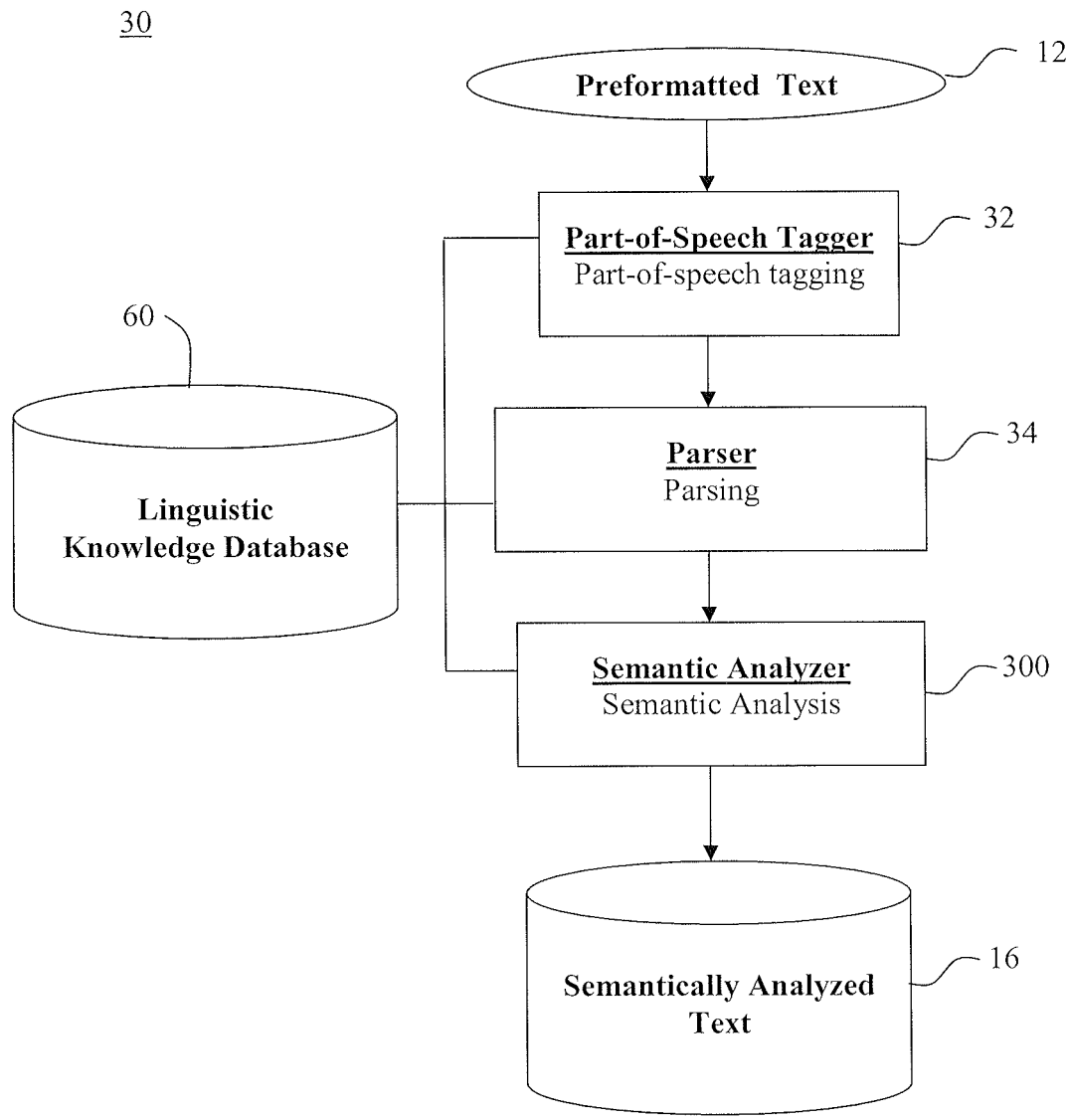
FIG. 2 is a high-level architecture diagram of an embodiment of a set of functional modules or processors, which can be implemented in one or more computers, to form a linguistic analyzer, according to aspects of the present invention.

FIG. 2 is a high-level architecture diagram of an embodiment of a set of functional modules or processors, which can be implemented in one or more computers, to form Linguistic Analyzer 30 of FIG. 1, according to aspects of the present invention. In other embodiments, Linguistic Analyzer 30 may include a different set of computer modules that perform substantially the same functions.

The Linguistic Analyzer 30 processes preformatted text received from a preformatter, for example, Preformatter 20 described above with regard to FIG. 1, to produce semantically analyzed text 16. The Preformatted Text 12 is received by a Parts-of-Speech (POS) Tagger 32, which determines and applies parts-of-speech tags to the Preformatted Text 12. A Parser 34 then parses the POS tagged text for processing by a Semantic Analyzer 300. In this embodiment, the functions performed by the POS Tagger 32 and the Parser 34 are preferably performed in accordance with the techniques described in U.S. Pat. No. 7,251,781.

Figure 3:
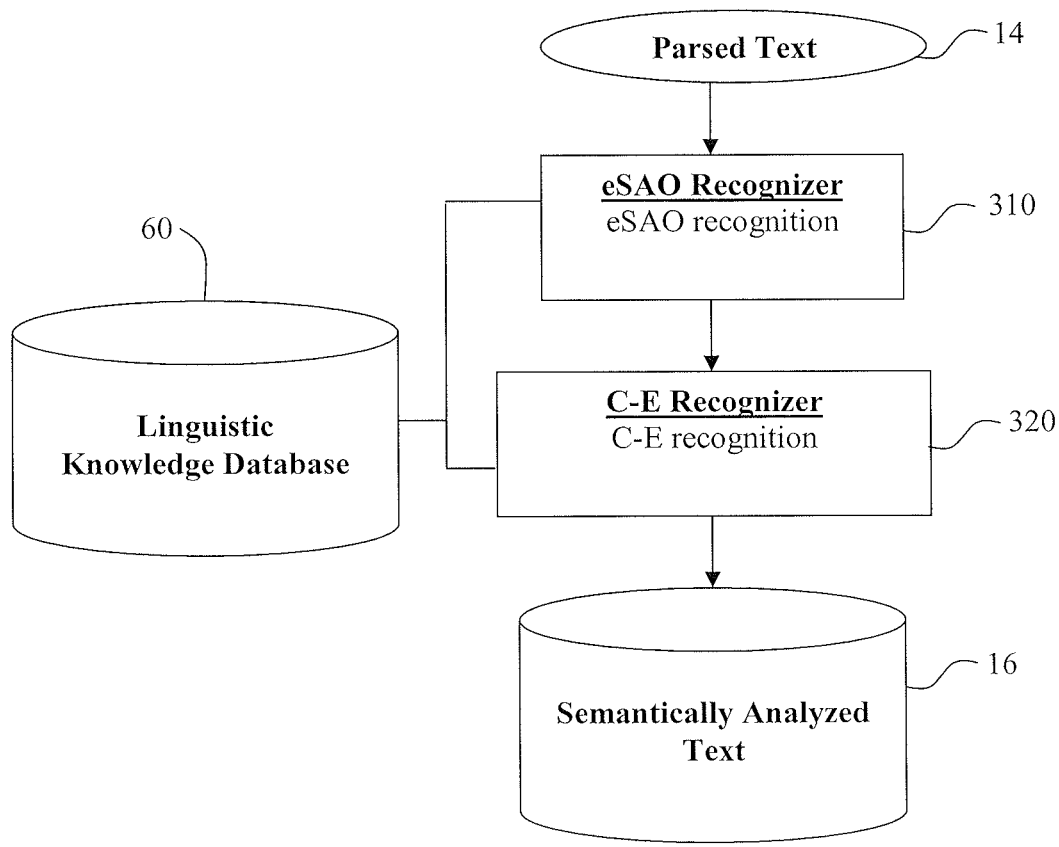
FIG. 3 is a high-level architecture diagram of an embodiment of a set of functional modules or processors, which can be implemented in one or more computers, to form a semantic analyzer, according to aspects of the present invention.

FIG. 3 is a high-level architecture diagram of an embodiment of a set of functional modules or processors, which can be implemented in one or more computers, to form Semantic Analyzer 300, according to aspects of the present invention. In this embodiment, the Semantic Analyzer 300 is similar to or the same as the Semantic Analyzer 300 described with regard to FIG. 2.

In this embodiment, Semantic Analyzer 300 receives Parsed Text 14 from a parser and produces the semantically analyzed text 16 from the Parsed Text 14. Semantic Analyzer 300 has an extended Subject-Action-Object (eSAO) Recognizer 310 that performs eSAO semantic relationship recognition and a C-E Recognizer 320 that performs cause-effect semantic relationship recognition within and/or between eSAOs. In addition to the semantic elements or components of the type Subject (S), Action (A), Object (O), semantic elements or components of the type Preposition, Indirect Object, Adjective, Adverbial are also recognized as eSAOs, in the present embodiment. As described above, other semantic relationships can be recognized, such as cause-effect relationships.

In the present embodiment, eSAO relationship recognition is preferably performed in accordance with the techniques described in U.S. Pat. No. 7,251,781. And also in the present embodiment, the cause-effect relationship recognition can be performed in accordance with the techniques described in U.S. Patent Application Publication No. 20060041424, incorporated by reference herein in its entirety.

FIGS. 4A and 4B illustrate examples of recognizing semantic relationships of the eSAO type in text that can be accomplished for input sentences by eSAO Recognizer 310 of FIG. 3. In particular, FIG. 4A and FIG. 4B show example outputs of eSAO Recognizer 310 for two specific sample sentences:

"A dephasing element guide completely suppresses unwanted modes" (in FIG. 4A); and
"The maximum value of x is dependent of the ionic radius of the lanthanide element" (in FIG. 4B).

In FIG. 4A, the eSAO components corresponding to Subject, Action, Object, and Adverbial have been determined from the input sentence by eSAO Recognizer 310.

In FIG. 4B, the eSAO components Subject, Action, Preposition, Indirect Object, and Adjective have been determined for the input sentence by eSAO Recognizer 310.

In the present embodiment, eSAO components Subject, Object, and Indirect Object have an inner structure, i.e., the components proper and their attributes, which correspond to a semantic relationship. For example, a Subject, Object, or Indirect Object determined from a sentence can be a parameter of a whole-part (or mereological) relationship, i.e., correspond to a whole or a part of such a relationship, or can be a parameter in other functional relationships.

Cause-effect relationships, according to the present embodiment, comprise pairing one or more complete and/or incomplete eSAOs, as causes, with one or more complete and/or incomplete eSAOs, as corresponding effects. Note that a single eSAO can spawn both a cause eSAO and an effect eSAO. Also, from the point of view of knowledge engineering and natural language particularities, cause-effect relationships can be found in separate eSAOs.

The C-E Recognizer 320 uses linguistic patterns, which can be stored in the Linguistic Knowledge Database 60, for detecting cause-effect relationships in text sentences inside a single eSAO and between different eSAOs. For example, patterns of the type "The "cause of" construction in Subject" arises inside a single eSAO, if the Subject has a "CAUSE_OF" sense and the Action links the Subject to the Object with a "BE" sense. In this pattern, "CAUSE_OF" subject sense is a non-terminal symbol denoting a noun phrase, which preferably conforms to the following pattern: a number of words; the word "cause" or "causes"; the preposition "of" followed by a number of words. The "CAUSE_OF" sense can be represented by the equation:

$$CAUSE\_OF = .*(\text{"cause"}|\text{"causes"})\text{"of"}.*$$

In a preferred embodiment, the "BE" sense at least equals the words or phrases "be|become".

FIG. 5A illustrates an example of a generic form of a linguistic pattern for recognition of C-E relationships inside a single eSAO. FIG. 5B shows the output of C-E recognizer 320 for a given sentence using of the linguistic pattern described in FIG. 5A.

In particular, FIG. 5B illustrates the eSAO type relationship recognized by eSAO Recognizer 310 for the input sentence "The cause of water evaporation is heat." And the cause-effect relationship recognized by C-E Recognizer 320 in this single eSAO, in accordance with the described above linguistic pattern, is shown, where the Effect "water evaporation" has the Cause "heat." Note that the symbol "-" mentioned in the examples above means that the corresponding component can have any meaning or refer to no symbol, or be empty.

Unlike the previous linguistic pattern, the pattern of the type "Adverbial Modifier of Purpose: TO VB|DO|HV" arises between two eSAOs, if a first eSAO, considered to be a Cause, has an Action having the "ACTIVE" sense and a second eSAO, considered to be an Effect, has an Action having the "TO_VB|DO|HV" sense. The "ACTIVE" Action sense is a non-terminal symbol that denotes an Action extracted from an active voice verb group. The "TO_VB|DO|HV" Action sense is a non-terminal symbol that denotes an Action extracted from a verb group including: any infinitive verb (VB); infinitive "have" (HV); or infinitive "do" (DO), with the article "to" preceding the verb.

FIG. 6A illustrates the generic form of a linguistic pattern useful for recognition of C-E relationships between two eSAOs. FIG. 6B shows the output of C-E Recognizer 320 for a specific sentence, using the linguistic pattern described in FIG. 6A. In FIG. 6A, the linguistic pattern requires that a Subject1 and an Object2 "exist," that is the Subject1 is in a first eSAO while the Object2 is in a second eSAO. The Action1 in the first eSAO must be "ACTIVE" and the Action2 in the second eSAO has to have the form "TO_VB|DO|HV," as discussed above.

FIG. 6B, in particular, illustrates the cause-effect relationship recognized by C-E Recognizer 320 from two eSAOs in the input sentence "The register contains the proper bit pattern to begin its shift-out operation," in accordance with the linguistic pattern described above with respect to FIG. 6A. Words and phrases from the input sentence are shown with their corresponding semantic labels, as determined using the linguistic pattern of FIG. 6A.

Semantic labels produced by Semantic Processor 100 for the input text during basic semantic analysis, together with lexical, grammatical, and syntactic tags, cover practically all lexical units of the input text, see FIG. 1. In the present embodiment, the Semantic Processor 100 enables efficient development of linguistic patterns useful for further text semantic labeling. For example, Semantic Processor 100 gives an expert the ability to "wrap" any particular example of a new target semantic relationship with labels for different levels of language analysis, such as: lexical, grammatical, syntactical, and semantic analyses, which can be independent of the language and knowledge domain. A user can specify the new target semantic relationship by highlighting corresponding words in a text fragment, e.g., on a computer display. Thus, the Semantic Processor 100 provides the ability, on the one hand, to generalize a linguistic pattern for recognizing semantic relationships in text and, on the other hand, to functionally support the automatic recognition of the semantic relationships in any text on the basis of the generalized linguistic pattern, since the Semantic Processor 100 can have access to the level or amount of text analysis needed for processing text using the linguistic pattern. This recognition can be performed in topical content as well as in logical content.

Figure 7:
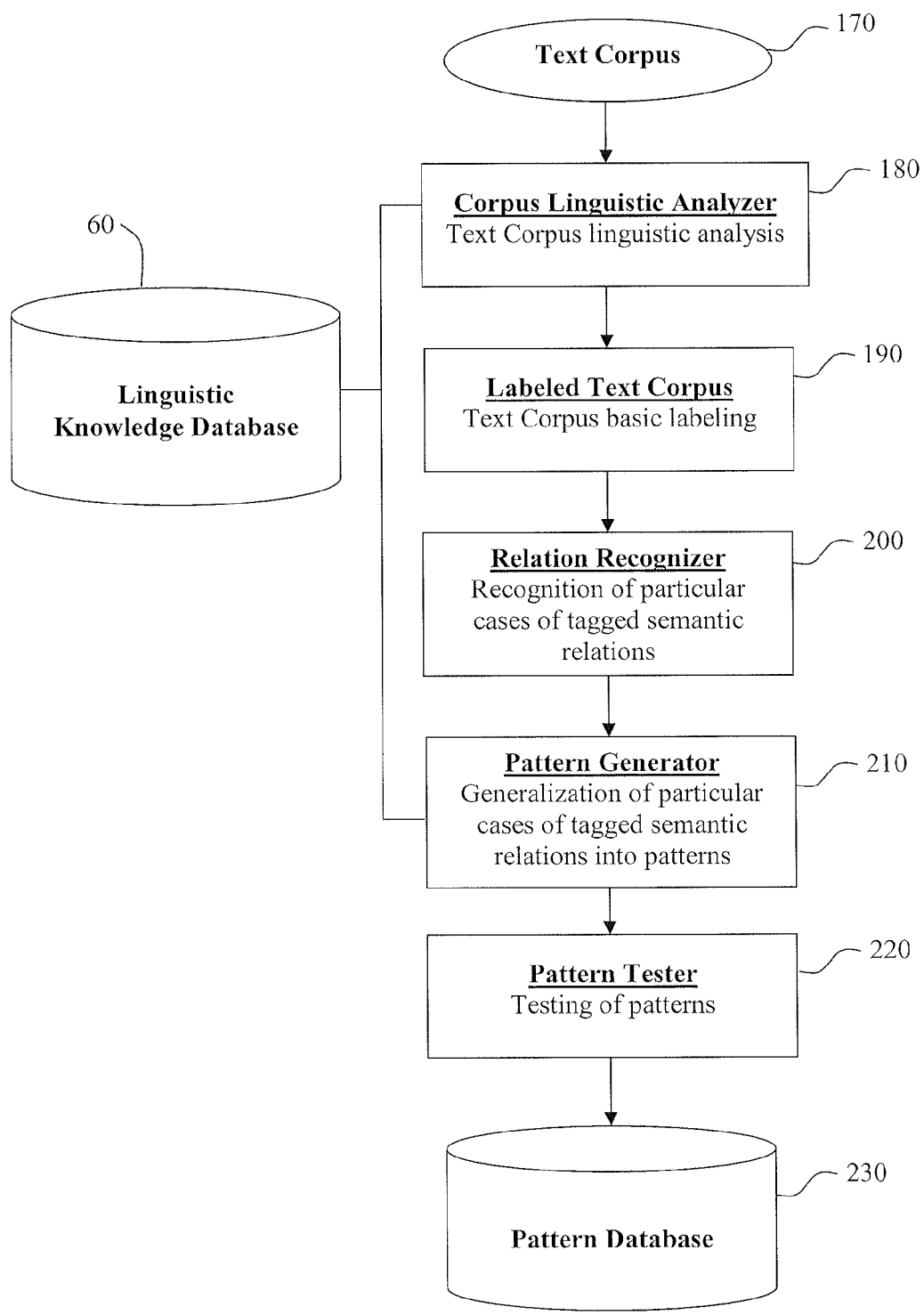
FIG. 7 is a high-level architecture diagram of an embodiment of a set of functional modules or processors, which can be implemented in one or more computers, for creation of linguistic patterns useful for automatic semantic labeling of text, according to aspects of the present invention.

FIG. 7 is a high-level architecture diagram of an embodiment of a set of functional modules or processors, which can be implemented in one or more computers, that can be used to create and store linguistic patterns useful for automatic semantic labeling of text, according to aspects of the present invention. In particular, FIG. 7 shows modules 180, 190, 200, 210, and 220 that may be used to automatically generate new linguistic patterns that may be implemented in the embodiments disclosed herein. In various embodiments, one or more of the modules of FIG. 7 can be included in at least one of the linguistic analyzer 30 and labeler 40 described above with regard to FIGS. 1-3.

As shown in FIG. 7, a sufficiently large corpus of natural language text documents, Text Corpus 170, is preferably used to establish and form a Pattern Database 230 comprised of a plurality of linguistic patterns. In other embodiments, any amount of text can be used, but may yield fewer linguistic patterns than a large corpus of text. A Corpus Linguistic Analyzer 180 performs a basic linguistic analysis on the Text Corpus 170, as described above. To accomplish the foregoing, the Semantic Processor 100 of FIGS. 1-3 could, for example, perform these functions as, or in conjunction with, the Corpus Linguistic Analyzer 180. A Labeled Text Corpus Generator 190 generates a corpus of sentences containing part-of-speech tags, syntactical tags, and semantic labels, based on the output of the Corpus Linguistic Analyzer 180 (or Semantic Processor 100) during basic linguistic analysis of the Text Corpus 170.

The Relation Recognizer 200 performs the process of recognition of some particular cases of semantic relationships (e.g., C-E relationships), which may be indicated in a list of labeled sentences containing the particular semantic relationships. For example, an expert can indicate specific semantic relationships of interest by indicating, e.g., via a computer display, labeled sentences output by the Labeled Text Corpus Generator 190 having the semantic relationships of interest. The Pattern Generator 210 generalizes particular cases of semantic relationships by using their labels to generate more general linguistic patterns, or target semantic relationship patterns. The Pattern Tester 220 then tests the generated patterns with the use of the Labeled Text Corpus 190, and places approved patterns into the Pattern Database 230.

The functions of the Relation Recognizer 200 can be performed manually by an expert, i.e., he or she can look through the Labeled Text Corpus 190 and find a fragment of text containing target semantic relationships, or it can be done automatically by the computer adapted to search of fragments of text containing target semantic relationships, or some combination thereof may be used. A user can, for example, specify a number of concepts that are definitely to be found in the target semantic relationship, and Relation Recognizer 200 can automatically search the Labeled Text Corpus 190 for fragments of text containing these concepts. For example, if the user is interested in a whole-part semantic relationship, the Relation Recognizer 200 would find in the Labeled Text Corpus 190 the sentence "The engine is located inside the car.," which contains the specified whole-part (i.e., car-engine) semantic relationship. Upon finding this sentence, the Corpus Linguistic Analyzer 180 performs part-of-speech tagging, parsing, and semantic analysis for this sentence, and sets corresponding semantic labels.

Table 1 illustrates the results of such an analysis for the above sentence, where short, lexical, grammatical and syntactic tags are omitted for clarity:

TABLE 1

| | |
|---|---|
| Subject | |
| Action | locate |
| Object | engine |
| Preposition | inside |
| Indirect Object | car |
| Adjective | |
| Adverbial | |

The Relation Recognizer 200 determines, for this example, that:
Whole=car
Part=engine The Pattern Generator 210 performs analysis and generalization of the whole-part relationship to the level of the pattern. The function of the Pattern Generator 210 can be performed manually by one or more experts, or automatically by a properly configured computer. In the former case, an expert can take into consideration his or her own experience and knowledge, as well as the knowledge contained in linguistic knowledge base, in making the appropriate analysis and generalizations.

Returning to the previous example, an expert should come to a conclusion that whole-part roles distribution, obtained in this example, results from the sense of the preposition "inside", and the preposition "within" has a meaning similar to the preposition "inside", and at least verbs "situate|contain|position|dispose|fix|mount|house" have a meaning similar to that of the verb "locate." Therefore, an expert or properly configured computer can register the generic form of the pattern prototype in the way represented in Table 2.

TABLE 2

| Subject | — | |
|---|---|---|
| Action | POSITION | |
| Object | not empty | Part |
| Preposition | INSIDE | |
| Indirect Object | not empty | Whole |
| Adjective | — | |
| Adverbial | — | |

This pattern arises if the Action field has a "POSITION" sense and is expressed in the original sentence by a verb in passive mode, and the Preposition field has an "INSIDE" sense. Here, the "POSITION" Action sense is a non-terminal symbol at least matching words or phrases including "locate|situate|contain|position|dispose|fix|install|mount|house." The "INSIDE" preposition sense is a non-terminal symbol that at least matches words or phrases including "inside|within."

Retrieval of values of non-terminal symbols, which itself represents generalization of linguistic patterns, may also be conducted in an automatic mode using a large enough Labeled Text Corpus 190, based on the eSAO format. Such corpus provides an efficient context for those purposes. For example, the Pattern Generator 210 will retrieve all the values of the non-terminal symbol INSIDE by fixing only the values of Action, Object, and Indirect Object fields (see Table 1) and then performing an automatic search in the Labeled Text Corpus 190 of all the sentences that have eSAOs with same values as the fixed ones, in the corresponding fields. Similarly, the Pattern Generator 210 will retrieve all the values of the non-terminal symbol POSITION by fixing values of Object, Preposition, and Indirect Object fields.

Below is another example of a sentence containing whole-part semantic relationships. This relationship describes a technical process and, as a result, is extracted from the set of eSAOs determined from the sentence:

"When initially creating an extension, take the following steps: coordinate the use of extension with the vendor; write an extension specification."

The result of processing this example by the Linguistic Analyzer 180 is given in Table 3 below.

TABLE 3

| | eSAO-1 | eSAO-2 | eSAO-3 | eSAO-4 |
|---|---|---|---|---|
| Subject | — | — | — | — |
| Action | create | take | coordinate | write |
| Object | extension | following steps | use of extension | extension specification |
| Preposition | — | — | with | — |
| Indirect Object | — | — | vendor | — |
| Adjective | — | — | — | — |
| Adverbial | initially | — | — | — |

The Relation Recognizer 200 determines for this example, that:
Whole=eSAO-1
Part={eSAO-3, eSAO-4}
Based on this example, the Pattern Generator 210 will build the following linguistic pattern according with the above described disclosure:

if an eSAO with an Action field included in the original sentence in the conditional clause (IF-clause) introduced by conjunctions where at least "if when" is followed by an eSAO that has an Action field with a "PERFORM" sense, and is further followed by one or more eSAOs separated by ";" or "," or other punctuation marks or conjunctions, than the first eSAO is marked as the Whole eSAO and the other eSAOs starting from the third eSAO are marked as the Part eSAOs.

In this pattern, the "PERFORM" Action sense is a non-terminal symbol at least matching words or phrases "follow|complete|do|perform|take".

Detailed description of the linguistic patterns for automatic recognition of Whole-Part semantic relationships in text documents is given in U.S. Patent Application Publication No. 20070156393, incorporated by reference herein in its entirety.

Another sentence gives an example of semantic relationship of PREVENTION type, namely "Aluminum should be isolated in order to prevent corrosion." A linguistic pattern for recognition of that relationship, built according with the above described embodiments, will have the possibility to operate even with the semantic label of cause-effect type. In this case, the subject of the pattern of PREVENT semantic relationship in this pattern will be eSAO-Cause (isolate—aluminum) and object of this relationship—object (including attributes if any) of eSAO-Effect (corrosion), provided that action of eSAO-Effect has "PREVENT" sense, i.e. at least match words "prevent|avoid|hamper|preclude|eliminate|inhibit."

The Pattern Tester 220, using prototypical linguistic patterns built by the Pattern Generator 210, looks for the examples of the described semantic relationship in the Labeled Text Corpus 190. An expert can analyze the retrieved examples and approve the pattern, possibly with some corrections. The computer could also be programmed or configured to perform this task. Either way, the Pattern Tester 220 then puts the approved pattern into the Pattern Database 230, which is a part of the Linguistic Knowledge Base 60 in the present embodiment.

The Labeler 40 shown in FIG. 1, in addition to the labels set in the input text by the Linguistic Analyzer 30, provides further semantic text labeling and/or target semantic labeling, according to linguistic patterns generated by the Pattern Generator 210, approved by the Pattern Tester 220, and included in the Linguistic Knowledge Base 60.

For example, the labels provided Labeler 40 of FIG. 1 are determined by applying patterns from the Pattern Database 230 (which can be included in the Linguistic Knowledge base 60) to semantically analyzed text 16. The labels provided by Labeler 40 can include labels indicating the types of semantic relationships discussed herein, or other types of semantic relationships, e.g., cause-effect and/or whole-part semantic relationships.

System functionality and databases may actually be co-located or distributed across many systems, subsystems, processors, and storage devices, which may collocated or remote to each other, including user devices and data sources. When remote to each other, communications between various systems, subsystems, processors, and storage devices can be accomplished using wired or wireless communications, over one or more of a variety of types of networks, including the Internet, World Wide Web, local area network, wide area network, virtual private network, and the like. Such networks can include a variety of computer systems, servers, and data storage devices, satellites, cellular networks, cable networks, telephone networks, and the like. Similarly, functionality and data of other relevant entities may be embodied in program code, resident in any of a variety of storage devices or systems and executed or accessed by any of a variety of processors.

Figure 8:
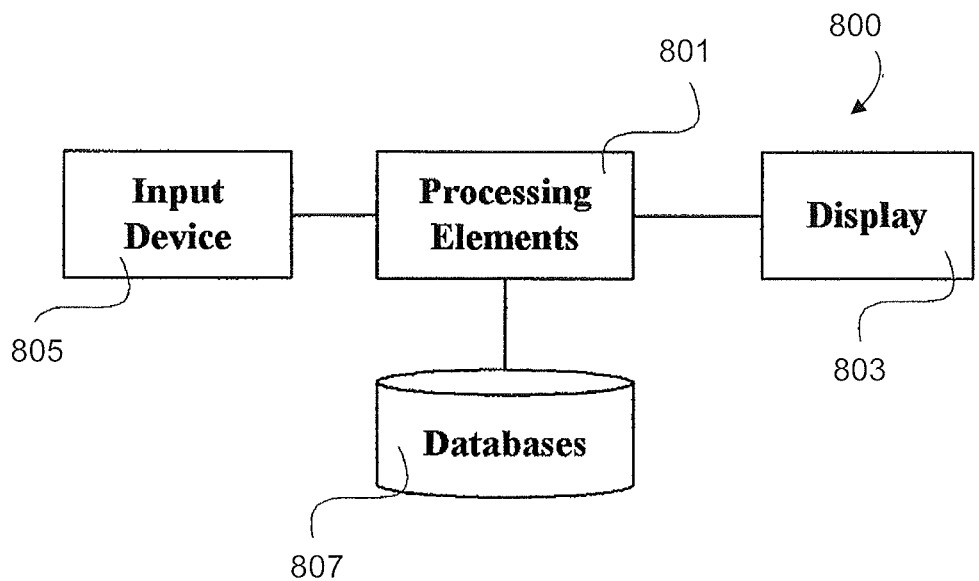
FIG. 8 shows an architecture diagram for an embodiment of a computer implementation that, when properly configured, can be used to perform one or more functions or methods described herein, according to aspects the present invention.

For example, embodiments in accordance with aspects of the present invention may be implemented in specially configured computer systems, such as the computer system 800 shown in FIG. 8. The computer system 800 may include at least one processing element 801, a display 803, an input device 805, and a link to databases 807 (or other computer-readable storage media) that provide the necessary information to accomplish the described semantic labeling.

In various embodiments, applications, functional modules, and/or processors described herein can include hardware, software, firmware, or some combination thereof. To the extent that functions are wholly or partly embodied in program code, those functions are executed by one or more processors that, taken together, are adapted to perform the particular functions of the inventive concepts, as one or more particular machines. And, to the extent software or computer program code or instructions (sometimes referred to as an "application") are used in various embodiments, it may be stored on or in any of a variety of non-transitory storage devices or media, and executed by one or more processors, microprocessors, microcontrollers, or other processing devices to achieve explicit, implicit, and or inherent functions of the systems and methods described herein. For example, the computer program code may be resident in memory in the processing devices or may be provided to the processing devices by floppy disks, hard disks, compact disk (CDs), digital versatile disks (DVDs), read only memory (ROM), or any other non-transitory storage medium. Such storage devices or media, and such processors, can be collocated or remote to each other, whether logically or physically. For instance, a system in accordance with the inventive concepts may access one or more other computers, database systems, etc. over a network, such as one or more of the Internet (and World Wide Web), intranets, extranets, virtual private networks, or other networks.

Figure 9:
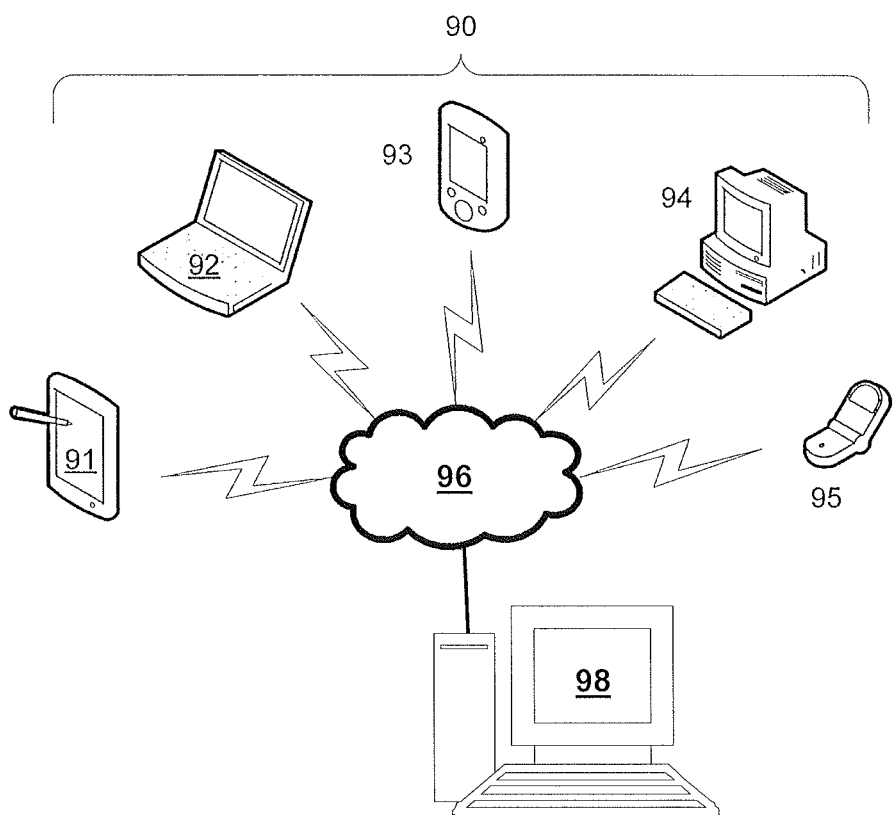
FIG. 9 is an embodiment of a network of computing devices, within which the present invention may be implemented.

As used herein, unless otherwise indicated, a computer can take the form of any known, or hereafter developed, device that includes at least one processor and storage media. For example, referring to FIG. 9, a computer or computer system can include a server 98, personal digital assistant (PDA) 91, laptop computer 92, portable music device 93, personal computer 94, cell phone 95, workstation (not shown), mainframe (not shown), or the like, or some combination thereof. Such devices may include one or more input devices, which may include a keypad or keyboard, microphone, video camera, touch-screen, and the like, as examples. Such devices may also include one or more output devices, which may include a video screen (e.g., computer, cell phone, or PDA screen), touch-screen, image projection system, speaker, printer, and the like, as examples. In some embodiments, a data port may also be considered an input device, output device, or both. In some embodiments, a variety of user devices 90 may interact with a knowledge search and mapping system 10 hosted on computer 98, which can be accessible via the Internet, as an example.

To the extent any elements described herein are remote to each other, they may communicate and/or exchange information over any of a variety of known, or hereafter developed, networks 96, e.g., local area networks, wide area networks, virtual private networks, intranets, computer-based social networks, cable networks, cellular networks, the Internet, the World Wide Web, or some combination thereof.

The foregoing Detailed Description of exemplary and preferred embodiments is presented for purposes of illustration. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art, having understood the disclosure herein. No limitation is intended by the description of exemplary embodiments which may have included tolerances, feature dimensions, specific operating conditions, engineering specifications, or the like, and which may vary between implementations or with changes to the state of the art, and no limitation should be implied therefrom.

This disclosure has been made with respect to the current state of the art, but also contemplates advancements and that adaptations in the future may take into consideration those advancements, namely in accordance with the then current state of the art. It is intended that the scope of the invention be defined by the Claims as written and equivalents as applicable. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . "

It is, therefore, understood that various modifications may be made and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A processor-implemented method for automatic labeling of natural language text, the method comprising:
   receiving text from at least one natural language document in electronic form;
   performing, using a processor, a basic linguistic analysis of the text that includes recognizing cause-effect relationships in the text and generating cause-effect labels for words or phrases in the text that form part of the cause-effect relationships;
   matching the linguistically analyzed text and the generated cause-effect labels against stored target semantic relationship patterns, wherein the stored target semantic relationship patterns generically describe semantic relationships between words or phrases, the stored target semantic relationships being derived in part from cause-effect relationships between words or phrases;

producing additional semantic relationship labels for the linguistically analyzed text based on the matching of the linguistically analyzed text and the generated cause-effect labels against the stored target semantic relationship patterns, wherein the additional semantic relationship labels are tagged to words or phrases from sentences within the linguistically analyzed text in order to identify semantic relationships between those words or phrases by identifying those words or phrases as components of semantic relationships of the stored target semantic relationship patterns; and storing the linguistically analyzed text and the additional semantic relationship labels in a non-transitory storage medium.

2. The method according to claim 1, further comprising:
applying parts-of-speech tags to at least portions of the text to generate tagged portions of the text;
parsing the tagged portions of the text to generate parsed and tagged portions of the text; and
wherein performing, using the processor, the basic linguistic analysis of the text includes semantically analyzing the parsed and tagged portions of the text to generate semantically analyzed, parsed and tagged portions of the text.

3. The method according to claim 2, wherein applying parts-of-speech tags is performed on preformatted portions of the text, whereby the preformatted portions of the text comprise the text with non-natural language symbols removed.

4. The method according to claim 2, wherein semantically analyzing the parsed and tagged portions of the text comprises:
recognizing one or more facts in the form of at least one expanded Subject-Action-Object (eSAO) set in the text, wherein each eSAO set has at least one eSAO component; and
recognizing in the text a set of rules that reflect regularities of at least one of an external domain and a knowledge domain in the form of cause-effect relationships in at least one eSAO set, wherein at least one cause-effect relationship of the cause-effect relationships comprises a cause eSAO and an effect eSAO.

5. The method according to claim 4, wherein the at least one eSAO component comprises text related to one or more elements selected from the group consisting of subjects, objects, actions, adjectives, prepositions, indirect objects, and adverbs.

6. The method according to claim 4, wherein recognizing one or more expanded Subject-Action-Object (eSAO) sets in the text comprises recognizing one or more subjects, objects, actions, adjectives, prepositions, indirect objects, and adverbs in at least one sentence of the text.

7. The method according to claim 4, wherein recognizing one or more expanded Subject-Action-Object (eSAO) sets and cause-effect relationships in the text comprises accessing a linguistic knowledge base having a database of patterns defining eSAO and cause-effect components.

8. The method according to claim 4, wherein the cause eSAO comprises at least one eSAO component of the at least one eSAO set and the effect eSAO comprises at least one other eSAO component of the at least one eSAO set.

9. The method according to claim 8, wherein the at least one cause-effect relationship comprises a sequential operator relating the at least one eSAO component of the cause eSAO to the at least one other eSAO component of the effect eSAO with lexical, grammatical, and/or semantic language means.

10. The method according to claim 1, wherein matching the linguistically analyzed text and the generated cause-effect labels against stored target semantic relationship patterns that are derived in part from cause-effect relationships further comprises:
accessing a semantic relationship pattern database that is a part of a linguistic knowledge database, wherein the semantic relationship pattern database is generated by:
performing a basic linguistic analysis of a corpus of text documents;
recognizing in the linguistically analyzed corpus particular cases of target semantic relationships;
generalizing the particular cases of target semantic relationships into semantic relationship linguistic patterns using lexical language units and their semantic classes, part-of-speech and syntactic tags, eSAO and cause-effect labels from the recognized particular cases of target semantic relationships; and
storing the semantic relationship linguistic patterns.

11. The method according to claim 10, wherein generalizing the particular cases of target semantic relationships into semantic relationship linguistic patterns uses an eSAO format as a context, and comprises:
generalizing constituent components of the particular cases of target semantic relationships by searching in the linguistically analyzed corpus of text documents using lexical, grammatical, syntactic, eSAO and cause-effect labels obtained for the components from the basic linguistic analysis.

12. The method according to claim 1, wherein matching the linguistically analyzed text and the generated cause-effect labels against the stored target semantic relationship patterns comprises matching the linguistically analyzed text against words, part-of-speech tags, syntactic tags, eSAO, and cause-effect sets in the stored target semantic relationship patterns.

13. A semantic processor for automatically semantic labeling of natural language text in electronic or digital form, the semantic processor comprising:
a preformatter that preformats received electronic text;
a linguistic analyzer that performs basic linguistic analysis of the preformatted text using a central processing unit (CPU), wherein the basic linguistic analysis includes:
recognizing objects or classes of objects within the text;
recognizing facts over the objects or classes of objects;
recognizing cause-effect relationships over the facts; and
creating tags that associate the text with corresponding cause-effect relationships; and
a labeler that matches the linguistically analyzed text and the created tags against stored target semantic relationship patterns to produce semantically labeled text, wherein the stored target semantic relationship patterns generically describe semantic relationships between words or phrases, the stored target semantic relationships being derived in part from cause-effect relationships between words or phrases, wherein the semantically labeled text includes semantic relationship labels that indicate semantic relationships between words or phrases from sentences within the text, wherein the semantic relationship labels indicate which words or phrases in the linguistically analyzed text are components of semantic relationships of the stored target semantic relationship patterns.

14. The semantic processor according to claim 13, wherein the linguistic analyzer comprises a semantic analyzer that produces semantically analyzed text, the semantic analyzer comprising:
- an expanded Subject-Action-Object (eSAO) recognizer that recognizes eSAOs sets in the text; and
- a cause-effect (C-E) recognizer that recognizes an eSAO cause-effect relationship of the cause-effect relationships,
- wherein eSAO and C-E recognition is based on linguistic patterns stored in a linguistic knowledge base.

15. The semantic processor according to claim 14, wherein the eSAO cause-effect relationship comprises a cause eSAO, an effect eSAO, and at least one sequential operator relating the cause eSAO to the effect eSAO.

16. The semantic processor according to claim 15, wherein each eSAO set comprises eSAO components and the cause eSAO comprises at least one eSAO component of the eSAO components and the effect eSAO comprises at least one eSAO component of the eSAO components that is different from the at least one eSAO component of the cause eSAO.

17. The semantic processor according to claim 14, wherein the eSAO components comprise text related to one or more elements selected from the group consisting of subjects, objects, actions, adjectives, prepositions, indirect objects and adverbs.

18. The semantic processor according to claim 14, wherein the linguistic analyzer further comprises:
- a part-of-speech (POS) tagger that receives the preformatted text and produces POS tagged text; and
- a parser that receives the POS tagged text, produces parsed text, and provides the parsed text to the semantic analyzer,
- wherein the parts-of-speech tagger and the parser operate with data stored in the linguistic knowledge base.

19. The semantic processor according to claim 13, wherein the preformatter performs at least one of a removal of any symbols in a digital or electronic presentation of the text that do not form part of natural language text, a detection and correction of any mismatches or mistakes in the text, and partitioning the text into structures of sentences and words.

20. The semantic processor according to claim 13, wherein the stored target semantic relationship patterns are created by a pattern generator comprising:
- a corpus linguistic analyzer that performs basic linguistic analysis of a corpus of text documents;
- a labeled text corpus generator that generates a labeled text corpus having part-of-speech tags, syntactic tags, eSAO labels, and cause-effect labels;
- a relation generator that recognizes in the labeled text corpus particular cases of target semantic relationships;
- a pattern generator that generalizes the particular cases of semantic relationships by using their labels to generate more general semantic relationship linguistic patterns, wherein the labels include lexical language units, their semantic classes, part-of-speech and syntactic tags, and eSAO and cause-effect labels; and
- a pattern tester for testing the general semantic relationship linguistic patterns by the pattern generator.

21. The semantic processor according to claim 20, wherein when generalizing the particular cases of target semantic relationships into semantic relationship linguistic patterns, the pattern generator uses an eSAO format as a context to:
- generalize constituent components as a result of searching in the linguistically analyzed corpus of text documents using of part-of-speech, syntactic, and eSAO and cause-effect labels obtained for the components at a level of the basic linguistic analysis.

22. The semantic processor according to claim 13, wherein the labeler matches the linguistically analyzed text against target semantic relationship patterns by matching words, part-of-speech tags, syntactic tags, eSAO and cause-effect sets.

23. A computer-implemented method for recognizing new types of linguistic patterns for use in a pattern database, the method comprising,
- performing, using a processor, a first level linguistic analysis of a natural language document to recognize and tag words indicative of objects and actions in the natural language document;
- performing a second level linguistic analysis of the natural language document by comparing the tags created during the first level linguistic analysis to linguistic patterns stored in a linguistic knowledge database and by creating semantic relationship labels indicative of semantic relationship linguistic patterns in the natural language document, the semantic relationship linguistic patterns including cause-effect relationships patterns; and
- performing a third level linguistic analysis of the natural language document by recognizing a new type of semantic relationship linguistic pattern based on the semantic relationship labels created during the second level linguistic analysis and on target semantic relationship patterns that generically describe semantic relationships between words or phrases, the target semantic relationships being derived in part from cause-effect relationships between words or phrases, the new type of semantic relationship linguistic pattern identifying a new semantic relationship between words or phrases in the natural language document.

24. The computer-implemented method of claim 23, wherein:
- performing the first level linguistic analysis includes recognizing and tagging components of at least one eSAO set;
- performing the second level linguistic analysis includes creating labels indicative of cause-effect patterns in the natural language document, the labels identifying words or phrases in the natural language document as components of the cause-effect patterns; and
- performing the third level linguistic analysis includes recognizing the new type of semantic relationship linguistic pattern using the labels indicative of cause-effect patterns created during the second level linguistic analysis, wherein the new type of semantic relationship linguistic pattern identifies a new semantic relationship between the words or phrases that are the components of the cause-effect patterns.

* * * * *